(12) United States Patent
Jung et al.

(10) Patent No.: US 11,824,217 B2
(45) Date of Patent: Nov. 21, 2023

(54) HIGH-VOLTAGE BATTERY-MOUNTING STRUCTURE FOR VEHICLE

(71) Applicants: HYUNDAI MOTOR COMPANY, Seoul (KR); KIA MOTORS CORPORATION, Seoul (KR)

(72) Inventors: Ji Woong Jung, Anyang-si (KR); Yong Hwan Choi, Seoul (KR); Yu Ri Oh, Pohang-si (KR); Tae Hyuck Kim, Asan-si (KR); Gyung Hoon Shin, Seoul (KR); Hae Kyu Lim, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 257 days.

(21) Appl. No.: 17/157,177

(22) Filed: Jan. 25, 2021

(65) Prior Publication Data
US 2022/0037731 A1  Feb. 3, 2022

(30) Foreign Application Priority Data
Aug. 3, 2020  (KR) ......................... 10-2020-0096848

(51) Int. Cl.
*B60K 1/04* (2019.01)
*H01M 50/249* (2021.01)
(Continued)

(52) U.S. Cl.
CPC ............. *H01M 50/249* (2021.01); *B60K 1/04* (2013.01); *H01M 50/262* (2021.01);
(Continued)

(58) Field of Classification Search
CPC ............. H01M 50/249; H01M 50/262; H01M 2220/20; B60K 1/04; B60K 2001/005; B60K 2001/0438; B60L 50/66
See application file for complete search history.

(56) References Cited

U.S. PATENT DOCUMENTS

| RE44,994 E | 7/2014 | Rawlinson et al. |
| 8,980,458 B2 * | 3/2015 | Honjo ...................... B60K 1/04 |
| | | 429/96 |

(Continued)

FOREIGN PATENT DOCUMENTS

| JP | 4801947 B2 | 8/2011 |
| JP | 5605470 B2 | 9/2014 |

(Continued)

*Primary Examiner* — Jason D Shanske
*Assistant Examiner* — James J Triggs
(74) *Attorney, Agent, or Firm* — LEMPIA SUMMERFIELD KATZ LLC

(57) ABSTRACT

The present disclosure includes: a mid-plate configured to support a bottom side of a battery module from a bottom side of a vehicle body; a fastening member fastened through a space in which the mid-plate and the battery module are mounted and configured to fix the mid-plate to the vehicle body; a mounting pipe provided at a top side of the mid-plate and configured to support a pressure applied to the vehicle body from a bottom side of the mid-plate, wherein the fastening member passes through the mounting pipe; a mounting support configured to fix the mounting pipe to the mid-plate, wherein the fastening member passes through the mounting support; and a shield plate coupled to the bottom side of the mid-plate and configured to surround a bottom-side coupling portion of the mounting support while allowing the fastening member to pass therethrough.

15 Claims, 5 Drawing Sheets

(51) Int. Cl.
*H01M 50/262* (2021.01)
*B60K 1/00* (2006.01)
*B60L 50/60* (2019.01)

(52) U.S. Cl.
CPC .............................. *B60K 2001/005* (2013.01); *B60K 2001/0438* (2013.01); *B60L 50/66* (2019.02); *H01M 2220/20* (2013.01)

(56) References Cited

U.S. PATENT DOCUMENTS

| | | | | |
|---|---|---|---|---|
| 10,661,647 | B2* | 5/2020 | Hofer | H01M 50/147 |
| 11,034,227 | B2* | 6/2021 | Spielvogel | B60L 58/26 |
| 11,142,058 | B2 | 10/2021 | Marquez Duran et al. | |
| 11,155,150 | B2* | 10/2021 | Stephens | B60K 11/02 |
| 11,462,793 | B2* | 10/2022 | Kagami | H01M 50/262 |
| 2011/0143179 | A1* | 6/2011 | Nakamori | B60K 1/04 429/99 |
| 2012/0156539 | A1 | 6/2012 | Honjo et al. | |
| 2016/0272246 | A1* | 9/2016 | Berger | H01M 50/24 |
| 2020/0180417 | A1 | 6/2020 | Marquez Duran et al. | |
| 2020/0350522 | A1* | 11/2020 | Choi | H01M 10/625 |
| 2022/0037731 | A1* | 2/2022 | Jung | H01M 10/613 |
| 2022/0144060 | A1* | 5/2022 | Shin | H01M 50/249 |
| 2022/0219523 | A1* | 7/2022 | Shin | H01M 50/244 |

FOREIGN PATENT DOCUMENTS

| | | |
|---|---|---|
| KR | 10-2014-0045778 | 4/2014 |
| KR | 101655482 B1 | 9/2016 |
| KR | 20200037237 A | 4/2020 |
| KR | 20220063505 A | 5/2022 |

\* cited by examiner

HIGH-VOLTAGE BATTERY-MOUNTING STRUCTURE FOR VEHICLE

CROSS REFERENCE TO RELATED APPLICATION

The present application claims priority to and the benefit of Korean Patent Application No. 10-2020-0096848, filed on Aug. 3, 2020, the entire contents of which are incorporated herein by reference.

FIELD

The present disclosure relates to a structure for mounting a high-voltage battery used in an electric vehicle or the like.

BACKGROUND

The statements in this section merely provide background information related to the present disclosure and may not constitute prior art.

It is desirable for a high-voltage battery mounted in an electric vehicle to have as high an energy storage capacity as possible. Therefore, in order to mount such a high-voltage battery, it is desirable to secure a considerable space under the floor between the front and rear wheels.

It is desirable that the high-voltage battery mounted under the vehicle floor is installed to provide safety against an impact applied from the outside of the lower side of the vehicle.

It should be understood that the foregoing description of the background art is provided merely for the purpose of promoting the understanding of the background of the present disclosure and should not to be accepted as acknowledging that the background art is known to those skilled in the art.

SUMMARY

The present disclosure provides a high-voltage battery-mounting structure for a vehicle that is adapted to provide the safety of a high-voltage battery and consequently sufficient durability of an electric vehicle by allowing the high-voltage battery to be firmly and safely mounted under a vehicle floor, thereby inhibiting the high-voltage battery from being damaged and fractured.

In order to achieve the technical task described above, a high-voltage battery mounting structure for a vehicle according to the present disclosure includes: a mid-plate configured to support a bottom side of a battery module from a bottom side of a vehicle body; a fastening member fastened through a space in which the mid-plate and the battery module are mounted and configured to fix the mid-plate to the vehicle body; a mounting pipe provided at a top side of the mid-plate and configured to support a pressure applied to the vehicle body from the bottom side of the mid-plate, wherein the fastening member passes through the mounting pipe; a mounting support configured to fix the mounting pipe to the mid-plate, wherein the fastening member passes through the mounting support; and a shield plate coupled to the bottom side of the mid-plate and configured to surround a bottom-side coupling portion of the mounting support while allowing the fastening member to pass therethrough.

The mounting support may include a central portion bent upward and configured to be coupled to a bottom side of the mounting pipe, and a peripheral portion having a top surface coupled to the bottom side of the mid-plate, and the shield plate may be configured to surround the peripheral portion of the mounting support from the bottom side of the peripheral portion.

The central portion of the mounting support may be coupled by welding such that the central portion is in contact with a lower end of the mounting pipe, the top surface of the peripheral portion of the mounting support may be coupled to the bottom side of the mid-plate by welding, and the shield plate may be coupled to a bottom surface of the peripheral portion by an adhesive and may be configured to surround a welded portion of the peripheral portion of the mounting support.

The mounting support may be coupled by welding such that the top surface of the peripheral portion is in contact with the bottom surface of the mid-plate.

A cooling panel may be coupled between the mid-plate and the shield plate and may form a flow path of a refrigerant together with the mid-plate, and the mounting support may be coupled by welding such that the top surface of the peripheral portion is in contact with the bottom surface of the cooling panel.

An adhesive may be locally applied to a space between the shield plate and the cooling panel.

A plurality of beads may be formed on the shield plate, the beads may be formed in a shape protruding upward from the shield plate, and the beads may have an elongated shape extending in the front-rear direction of the vehicle body.

The portion in which the adhesive is locally applied to the space between the shield plate and the cooling panel may be the portion in which the beads of the shield plate protrude.

In order to achieve the technical task described above, a high-voltage battery case for a vehicle according to the present disclosure includes: a case frame configured to surround a periphery of a battery module; a mid-plate finishing a bottom side of the case frame and configured to support a bottom side of the battery module; a mounting pipe provided on a top side of the mid-plate; a mounting support configured to fix the mounting pipe to the mid-plate; a fastening member configured to fixedly press the mid-plate against the bottom side of the vehicle body, penetrate the mounting pipe, and pass through the mounting support; and a shield plate coupled to the bottom side of the mid-plate and configured to surround a bottom-side coupling portion of the mounting support while allowing the fastening member to pass therethrough.

The mounting support may include a central portion having a hole through which the fastening member passes and protruding upward, and a peripheral portion protruding downward relative to the central member, the central portion may be coupled such that the top surface thereof is in contact with the lower end of the mounting pipe, and the top surface of the peripheral portion may be coupled to the bottom side of the mid-plate.

In the shield plate, a portion meeting the peripheral portion of the mounting support protrudes upward and is configured to be coupled to the bottom surface of the peripheral portion of the mounting support.

The central portion of the mounting support may be coupled by welding such that the central portion is in contact with a lower end of the mounting pipe, the top surface of the peripheral portion of the mounting support may be coupled to the bottom side of the mid-plate by welding, and the shield plate may be coupled to a bottom surface of the peripheral portion by an adhesive and be configured to surround a welded portion of the peripheral portion of the mounting support.

A cooling panel may be coupled between the mid-plate and the shield plate and form a flow path of a refrigerant together with the mid-plate, and the mounting support may be coupled by welding such that the top surface of the peripheral portion is in contact with the bottom surface of the cooling panel.

A plurality of beads may be formed on the shield plate, the beads may be formed in a shape protruding upward from the shield plate, and may have an elongated shape extending in the front-rear direction of the vehicle body.

An adhesive may be applied to the portion in which the beads protrude upward so as to couple the shield plate with the cooling panel.

The present disclosure makes it possible to provide the safety of a high-voltage battery and consequently the sufficient durability of an electric vehicle by allowing the high-voltage battery to be firmly and safely mounted under a vehicle floor, thereby inhibiting the high-voltage battery from being damaged and fractured.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
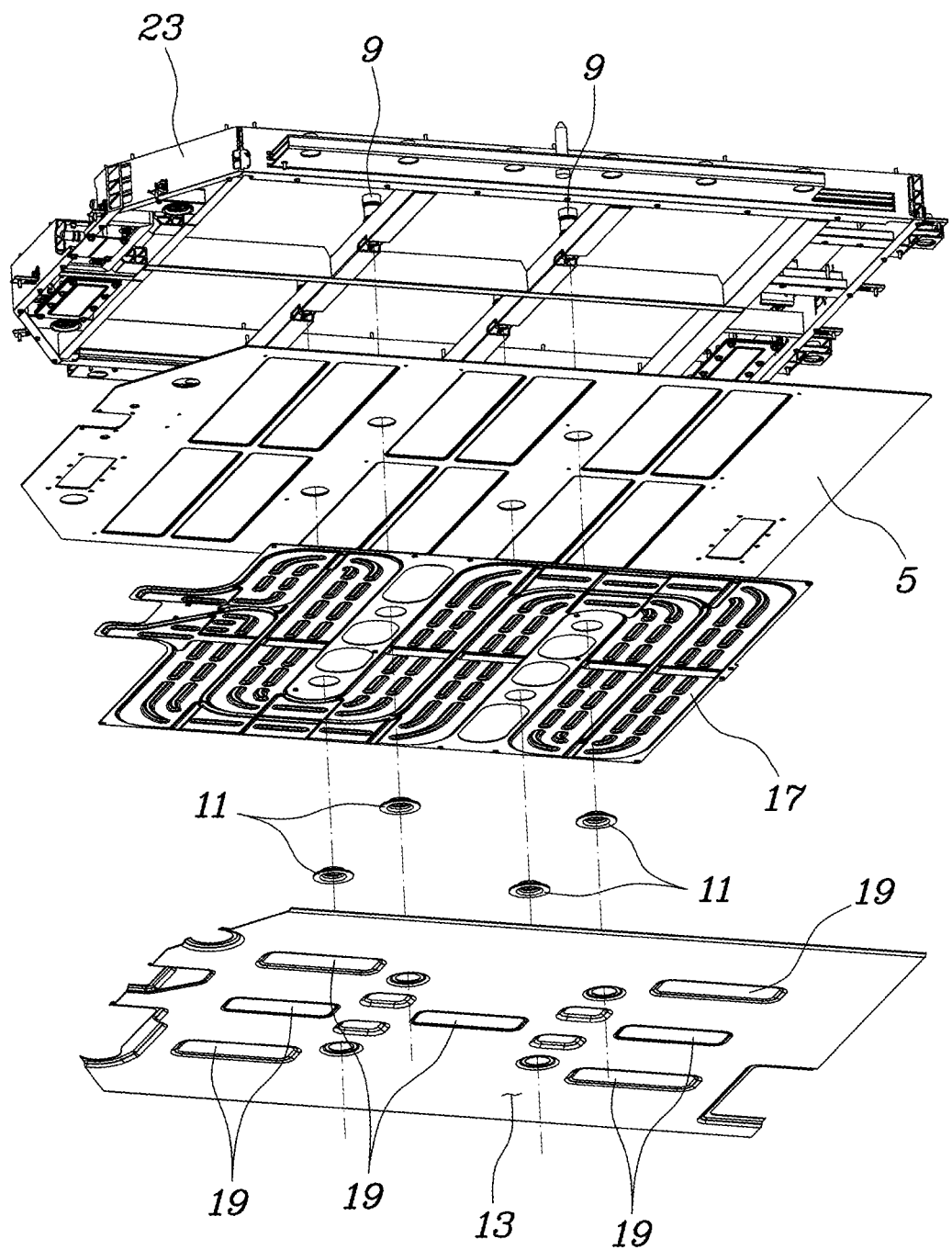
FIG. 1 is a view illustrating a high-voltage battery-mounting structure for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 5, a high-voltage battery mounting structure for a vehicle according to the present disclosure includes: a mid-plate 5 configured to support the bottom side of a battery module 3 from the bottom side of a vehicle body 1; a fastening member 7 fastened through a space in which the mid-plate 5 and the battery module 3 are mounted so as to fix the mid-plate 5 to the vehicle body 1; a mounting pipe 9 provided at the top side of the mid-plate 5 so as to support a pressure applied to the vehicle body 1 from the bottom side of the mid-plate 5, the fastening member 7 passing through the mounting pipe 9; a mounting support 11 installed to fix the mounting pipe 9 to the mid-plate 5, the fastening member 7 passing through the mounting support 11; and a shield plate 13 coupled to the bottom side of the mid-plate 5 to surround a bottom-side coupling portion of the mounting support 11 while allowing the fastening member 7 to pass therethrough.

That is, according to the present disclosure, the fastening member 7 penetrates the space, in which the battery module 3 is mounted, and the mid plate 5, and presses the bottom side of the mid-plate 5 against the vehicle body 1 so as to fix the mid-plate 5, whereby the battery module 3 constituting a high-voltage battery can be placed in a solid and stable mounting state with respect to the vehicle body 1.

In particular, according to the present disclosure, it is possible to provide a more stable and firm high-voltage battery-mounting state by providing a structure for mounting the mounting pipe 9 and the mounting support 11 so as to apply the fastening force of the fastening member 7 to the mid-plate 5 and a structure for protecting the coupling state of the mounting support 11.

Figure 3:
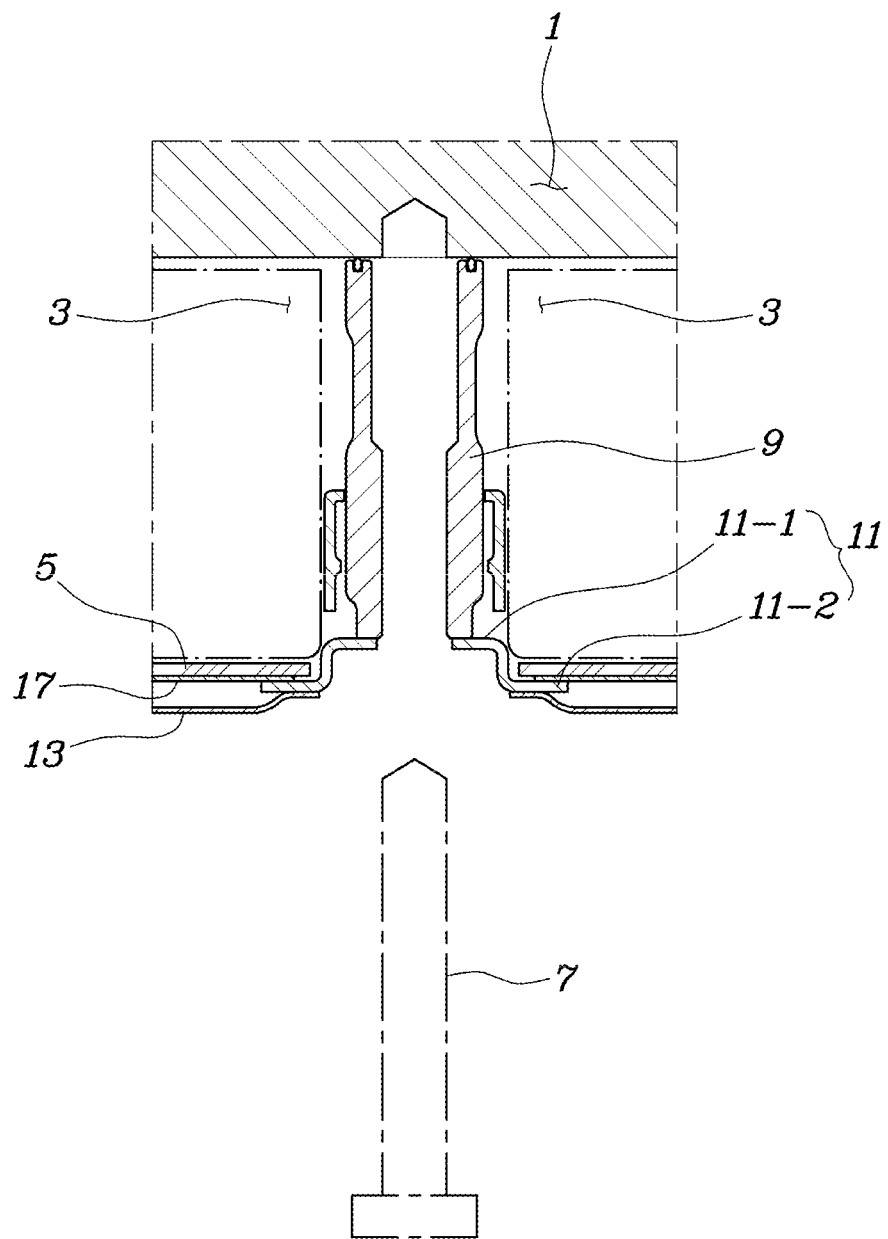
FIG. 3 is a cross-sectional view taken along line in FIG. 2.

The fastening member 7 may be made of a fastening bolt as illustrated in FIG. 3. In addition, all kinds of mechanical structures capable of firmly fixing the mid plate 5 to the vehicle body 1 by vertically penetrating the battery module 3 and the mid-plate 5 will be capable of functioning as the fastening member.

The mounting support 11 includes a central portion 11-1 which is bent upward and coupled to the bottom side of the mounting pipe 9, and a peripheral portion 11-2 having a top surface coupled to the bottom side of the mid-plate 5, and the shield plate 13 is coupled to surround the peripheral portion 11-2 of the mounting support 11 from the bottom side of the peripheral portion 11-2.

That is, the central portion 11-1 of the mounting support 11 is coupled by welding in the state of being in contact with the lower end of the mounting pipe 9, the top surface of the peripheral portion 11-2 of the mounting support 11 is coupled to the bottom side of the mid-plate 5 by welding, and the shield plate 13 is coupled to the bottom surface of the peripheral portion 11-2 by an adhesive 15 so as to surround the welded portion of the peripheral portion 11-2 of the mounting support 11.

In this form, between the mid-plate 5 and the shield plate 13, a cooling panel 17 is coupled to form a flow path of a refrigerant together with the mid-plate 5, and the mounting support 11 is coupled by welding in the state in which the top surface of the peripheral portion 11-2 is in contact with the bottom surface of the cooling panel 17.

That is, the cooling panel 17 is a structure having a plurality of grooves capable of forming the flow path by being coupled to the bottom side of the mid-plate 5. When the mounting support 11 is coupled to the portion in which the cooling panel 17 is coupled to the mid-plate 5, the mounting support 11 is welded to the bottom surface of the cooling panel 17 by welding, rather than being directly coupled to the mid-plate 5.

Of course, even when the cooling panel 17 is provided on the bottom side of the mid-plate 5, the cooling panel 17 may be coupled by welding in the state in which the top surface of the peripheral portion 11-2 of the mounting support 11 is in direct contact with the bottom surface of the mid-plate 5 by making the cooling panel 17 not extend to the portion where the mounting support 11 is mounted.

As described above, since the shield plate 13 is coupled in the state of surrounding the bottom side of the peripheral portion 11-2 of the mounting support 11, the bottom-side coupling portion, in which the mounting support 11 is coupled to the cooling panel 17 or the mid-plate 5 by welding as describe above, is formed in the state of being protected by the shield plate 13 without being directly exposed to the bottom side of the peripheral portion 11-2.

When the bottom-side coupling portion of the mounting support 11 is protected by the shield plate 13 coupled using the adhesive 15 as described above, the bottom-side coupling portion of the mounting support 11 formed by welding is protected from an impact applied by foreign matter or a heavy object from the bottom side of the vehicle, whereby it is possible to inhibit cracks from occurring in the welding portions and thus to maintain the firmly assembled state of the high-voltage battery.

Meanwhile, a plurality of beads 19 are formed on the shield plate 13, the beads 19 are formed in a shape protruding upward from the shield plate 13 and have an elongated shape extending in the front-rear direction of the vehicle body 1.

That is, the shield plate 13 is made of, for example, a sheet-molding compound (SMC) (a reinforced thermosetting plastic), and has a plurality of beads 19 to reinforce its own structural rigidity. The beads 19 may be formed to be elongated in the front-rear direction of a vehicle on which the shield plate 13 is mounted, whereby the air resistance against the driving of the vehicle can be reduced as much as possible.

An adhesive 15 may be locally applied to a space between the shield plate 13 and the cooling panel 17 so as to form a firmer coupling structure. In one form, the adhesive 15 is applied to a portion where the protruding beads 19 of the shield plate 13 contact the cooling panel 17.

Figure 2:
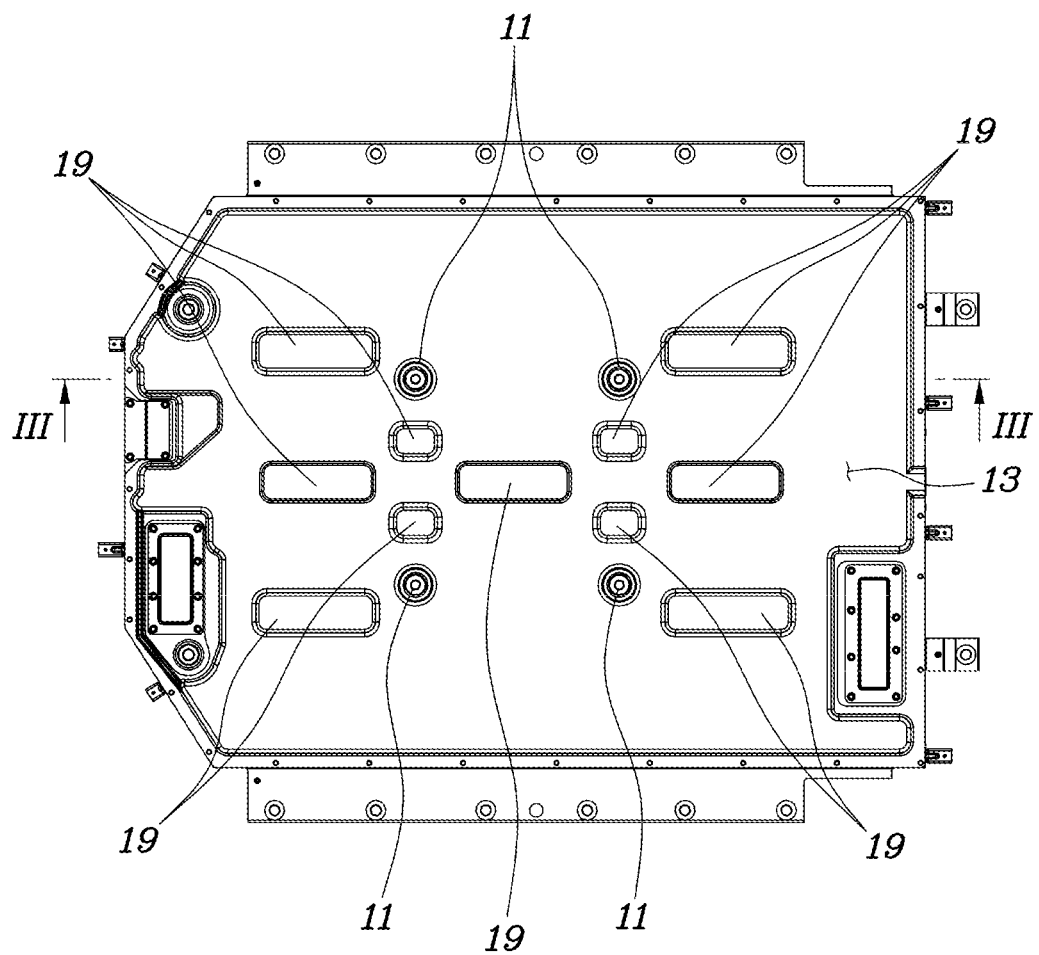
FIG. 2 is a bottom view of a high-voltage battery case of FIG. 1.
Figure 4:
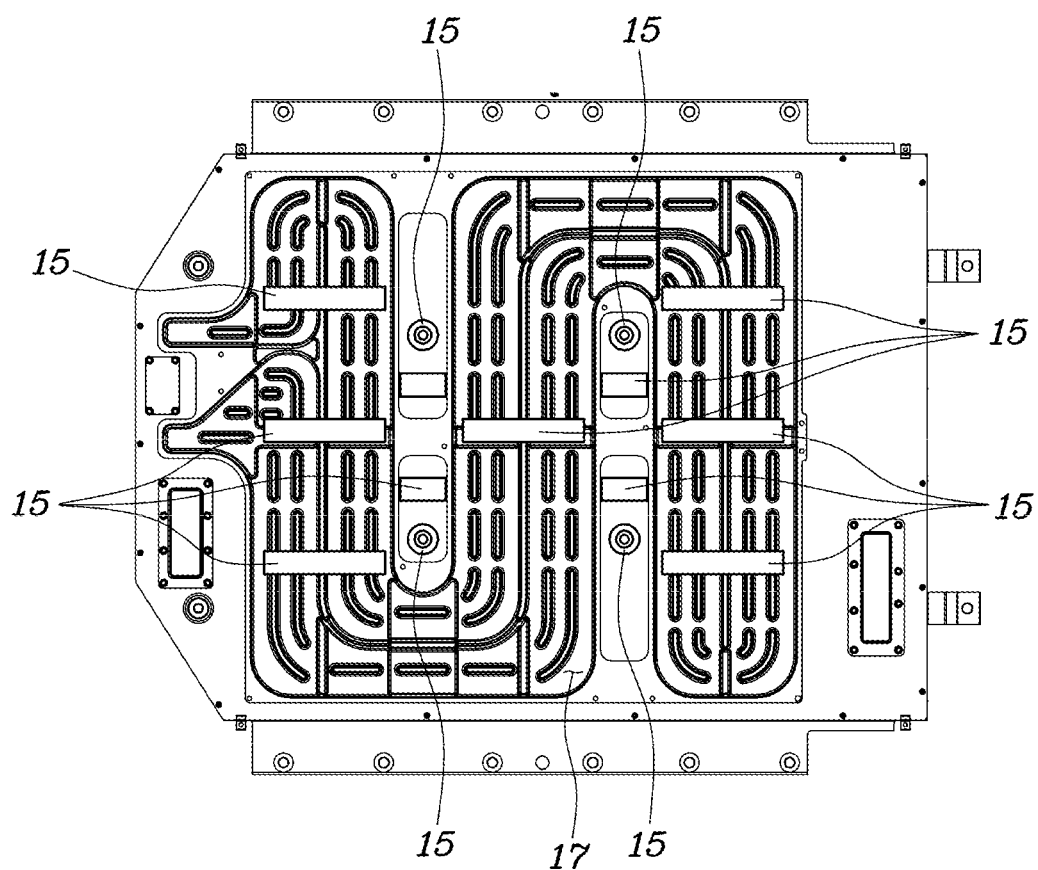
FIG. 4 is a view illustrating adhesive-applied portions in the state in which a shield plate is removed from FIG. 2.

That is, the adhesive 15 is applied to the portion of the cooling panel 17 as illustrated in FIG. 4, and the shield plate 13 having the shape illustrated in FIG. 2 is overlapped and bonded to the cooling panel 17.

Of course, in addition to this, a coupling means such as a flow drill screw (FDS) may be used in parallel so as to fix the shield plate 13.

When the fastening member 7 is fastened so as to penetrate the mounting support 11 and the mounting pipe 9 installed in the structure as described above, the mounting pipe 9 is fixed to the mid-plate 5 through the mounting support 11. The pressure applied upward by the fastening member 7 does not directly act on the mid-plate 5, but acts on the mounting pipe 9 through the mounting support 11, and the pressure acting on the mounting support 11 from the fastening member 7 fixes the mounting pipe 9 by firmly pressing the mounting pipe 9 against the vehicle body 1. The mid-plate 5 secures a firmly fixed state with respect to the vehicle body 1 through the mounting support 11 and the mounting pipe 9.

Figure 5:
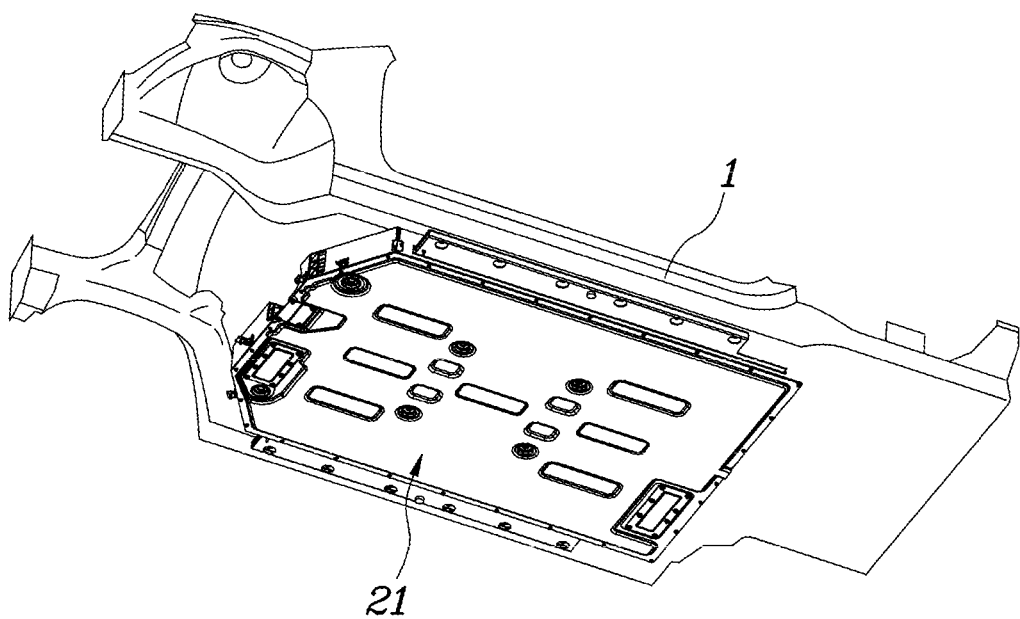
FIG. 5 is a view illustrating the state in which the high-voltage battery case of the present disclosure is mounted on a vehicle body.

Meanwhile, in order to mount a high-voltage battery on the bottom side of the vehicle 1 as illustrated in FIG. 5, a high-voltage battery case 21 for a vehicle according to the present disclosure includes: a case frame 23 provide to surround a periphery of a battery module 3; a mid-plate 5 installed to support the bottom side of the battery module 3 by finishing the bottom side of the case frame 23; a mounting pipe 9 provided on the top side of the mid-plate 5 such that a fastening member 7 configured to fixedly press the mid-plate 5 against the bottom side of the vehicle body 1 penetrates the mounting pipe 9; a mounting support 11 installed to fix the mounting pipe 9 to the mid-plate 5, the fastening member 7 passing through the mounting support 11; and a shield plate 13 coupled to the bottom side of the mid-plate 5 to surround a bottom-side coupling portion of the mounting support 11 while allowing the fastening member 7 to pass therethrough.

The mounting support 11 includes a central portion 11-1 having a hole, through which the fastening member 7 passes, and protruding upward, and a peripheral portion 11-2 protruding relatively downward, the central portion 11-1 is coupled in the state in which the top surface thereof is in contact with the lower end of the mounting pipe 9, and the top surface of the peripheral portion 11-2 is coupled to the bottom side of the mid-plate 5.

In the shield plate 13, a portion meeting the peripheral portion 11-2 of the mounting support 11 protrudes upward to be coupled to the bottom surface of the peripheral portion 11-2 of the mounting support.

The central portion 11-1 of the mounting support 11 is coupled by welding in the state of being in contact with the lower end of the mounting pipe 9, the top surface of the peripheral portion 11-2 of the mounting support 11 is coupled to the bottom side of the mid-plate 5 by welding, and the shield plate 13 is coupled to the bottom surface of the peripheral portion 11-2 by an adhesive 15 so as to surround the welded portion of the peripheral portion 11-2 of the mounting support 11.

Between the mid-plate 5 and the shield plate 13, a cooling panel 17 is coupled to form a flow path of a refrigerant together with the mid-plate 5, and the mounting support 11 is coupled by welding in the state in which the top surface of the peripheral portion 11-2 is in contact with the bottom surface of the cooling panel 17.

Of course, when the cooling panel 17 does not extend between the mounting support 11 and the mid-plate 5, the mounting support 11 is coupled by welding in the state in which the peripheral portion 11-2 is in direct contact with the mid-plate 5.

A plurality of beads 19 are formed on the shield plate 13, the beads 19 are formed in a shape protruding upward from the shield plate 13, and have an elongated shape extending in a front-rear direction of the vehicle body 1, so that the air resistance to the vehicle can be reduced.

An adhesive 15 is applied to the portion in which the beads 19 of the shield plate 13 protrudes upward so as to couple the shield plate 13 with the cooling panel 17, thereby more firmly fixing the shield plate 13 to the cooling panel 17.

The high-voltage battery case 21 configured as described above may be provided with a separate upper cover so as to surround the top side of the battery module 3 accommodated therein, and as described above, the case frame 23, the mid-plate 5, the cooling panel 17, and the shield plate 13 may be sequentially overlapped from the upper cover so as to be coupled to the bottom side of the floor of the vehicle body 1 by the fastening member 7.

The peripheral portion 11-2 of the mounting support 11 supporting the fastening member 7 is welded to the bottom side of the mid-plate 5 so as to the bottom-side coupling portion, and the bottom side of the bottom-side coupling portion 13 is surrounded and supported by the shield plate 13 coupled via the adhesive 15. Therefore, infiltration of foreign matter from the bottom side of the vehicle can be effectively inhibited, and even if an impact is applied by a heavy object, occurrence of cracks in the welded portions can be inhibited. Consequently, it is possible to continuously maintain a firm and stable mounting state of a high-voltage battery.

While the present disclosure has been illustrated and explained with respect to specific forms thereof, it will be obvious to a person ordinarily skilled in the art that the present disclosure can be variously modified and changed without departing from the scope of the technical idea of the present disclosure, which is defined by the accompanying claims.

What is claimed is:

1. A high-voltage battery mounting structure for a vehicle, the structure comprising:
    a mid-plate configured to support a bottom side of a battery module from a bottom side of a vehicle body;
    a fastening member fastened through a space in which the mid-plate and the battery module are mounted and configured to fix the mid-plate to the vehicle body;
    a mounting pipe provided at a top side of the mid-plate, wherein the fastening member passes through the mounting pipe;
    a mounting support configured to fix the mounting pipe to the mid-plate, wherein the fastening member passes through the mounting support; and
    a shield plate coupled to the bottom side of the mid-plate and configured to surround a bottom-side coupling portion of the mounting support while allowing the fastening member to pass therethrough.

2. The structure of claim 1, wherein the mounting support includes:
    a central portion being bent upward and configured to be coupled to a bottom side of the mounting pipe; and
    a peripheral portion having a top surface coupled to the bottom side of the mid-plate,
    wherein the shield plate is configured to surround the peripheral portion of the mounting support from a bottom side of the peripheral portion.

3. The structure of claim 2, wherein:
    the central portion of the mounting support is coupled to a lower end of the mounting pipe by welding,
    a top surface of the peripheral portion of the mounting support is coupled to the bottom side of the mid-plate by welding, and
    the shield plate is coupled to a bottom surface of the peripheral portion by an adhesive and is configured to surround a welded portion of the peripheral portion of the mounting support.

4. The structure of claim 3, wherein the top surface of the peripheral portion of the mounting support is coupled to a bottom surface of the mid-plate by welding.

5. The structure of claim 3, further comprising:
    a cooling panel coupled between the mid-plate and the shield plate and configured to form a flow path of a refrigerant together with the mid-plate,
    wherein the top surface of the peripheral portion of the mounting support is coupled to a bottom surface of the cooling panel by welding.

6. The structure of claim 5, wherein an adhesive is applied to a space between the shield plate and the cooling panel.

7. The structure of claim 6, wherein a plurality of beads are formed on the shield plate and in a shape protruding upward from the shield plate and wherein the plurality of beads respectively have an elongated shape extending in a front-rear direction of the vehicle body.

8. The structure of claim 7, wherein the adhesive is applied to a portion where the protruding beads of the shield plate contact the cooling panel.

9. A high-voltage battery case for a vehicle, the case comprising:
    a case frame configured to surround a periphery of a battery module;
    a mid-plate coupled to a bottom side of the case frame and support a bottom side of the battery module;
    a mounting pipe provided on a top side of the mid-plate;
    a mounting support configured to fix the mounting pipe to the mid-plate;
    a fastening member configured to fixedly press the mid-plate against a bottom side of a vehicle body, penetrate the mounting pipe, and pass through the mounting support; and
    a shield plate coupled to a bottom side of the mid-plate and configured to surround a bottom-side coupling portion of the mounting support while allowing the fastening member to pass therethrough.

10. The case of claim 9, wherein the mounting support includes:
    a central portion configured to protrude upward and having a hole through which the fastening member passes; and
    a peripheral portion protruding downward relative to the central portion,
    wherein a top surface of the central portion is coupled to a lower end of the mounting pipe, and
    wherein a top surface of the peripheral portion is coupled to the bottom side of the mid-plate.

11. The case of claim 10, wherein, in the shield plate, a portion meeting the peripheral portion of the mounting support protrudes upward and is configured to be coupled to a bottom surface of the peripheral portion of the mounting support.

12. The case of claim 11, wherein the central portion of the mounting support is coupled to the lower end of the mounting pipe by welding,
    the top surface of the peripheral portion of the mounting support is coupled to the bottom side of the mid-plate by welding, and
    the shield plate is coupled to a bottom surface of the peripheral portion by an adhesive and is configured to surround a welded portion of the peripheral portion of the mounting support.

13. The case of claim 12, further comprising:
    a cooling panel coupled between the mid-plate and the shield plate and configured to form a flow path of a refrigerant together with the mid-plate,
    wherein the top surface of the peripheral portion of the mounting support is coupled to a bottom surface of the cooling panel by welding.

14. The case of claim 13, wherein a plurality of beads are formed on the shield plate in a shape protruding upward from the shield plate and have an elongated shape extending in a front-rear direction of the vehicle body.

15. The case of claim 14, wherein an adhesive is applied to a portion in which the plurality of beads protrude upward and couples the shield plate with the cooling panel.

* * * * *